Jan. 14, 1947.　　　C. B. WILLIAMS　　　2,414,250
ASSEMBLY FOR ELIMINATING MUZZLE CLIMB IN AUTOMATIC FIREARMS
Filed Feb. 17, 1944　　　6 Sheets-Sheet 1

Jan. 14, 1947.   C. B. WILLIAMS   2,414,250
ASSEMBLY FOR ELIMINATING MUZZLE CLIMB IN AUTOMATIC FIREARMS
Filed Feb. 17, 1944   6 Sheets-Sheet 2

Inventor
Clarence B. Williams
By James P. Burns
Attorney

Jan. 14, 1947.  C. B. WILLIAMS  2,414,250
ASSEMBLY FOR ELIMINATING MUZZLE CLIMB IN AUTOMATIC FIREARMS
Filed Feb. 17, 1944  6 Sheets-Sheet 4

Jan. 14, 1947. C. B. WILLIAMS 2,414,250
ASSEMBLY FOR ELIMINATING MUZZLE CLIMB IN AUTOMATIC FIREARMS
Filed Feb. 17, 1944 6 Sheets-Sheet 5

Inventor
Clarence B. Williams
By James P. Burns
Attorney

Jan. 14, 1947.  C. B. WILLIAMS  2,414,250
ASSEMBLY FOR ELIMINATING MUZZLE CLIMB IN AUTOMATIC FIREARMS
Filed Feb. 17, 1944  6 Sheets-Sheet 6

Inventor
Clarence B. Williams
By James P. Burns
Attorney

Patented Jan. 14, 1947

2,414,250

UNITED STATES PATENT OFFICE 2,414,250

ASSEMBLY FOR ELIMINATING MUZZLE CLIMB IN AUTOMATIC FIREARMS

Clarence B. Williams, Grass Valley, Calif.

Application February 17, 1944, Serial No. 522,814

6 Claims. (Cl. 42—71)

In automatic firearms, the rapid succession of discharges during full automatic fire produces a progression of power impulses or vibrations which cause the muzzle of the firearm to rise or "climb" in a manner which makes it impossible for the operator to hold the line of fire on the target. Prior to my invention, the only procedure for satisfactorily overcoming this climbing tendency of the muzzle has been to limit full automatic fire of such firearms to bursts of three, four or five shots, the climb of the muzzle not being considered excessive during the firing of such short bursts. It is obvious, however, that the requirement for limiting full automatic fire to short bursts of shots results in a loss of much of the value of the full automatic fire cycle of automatic firearms.

The purpose of my invention is to provide an assembly for suppressing muzzle climb during full automatic fire of automatic firearms to enable an operator to realize the full benefit of the full automatic fire cycle of such firearms. My invention is particularly applicable to automatic firearms such as light machine guns known as sub-machine guns, which are intended to be held by both hands of the operator and fired either from the shoulder or from the hip. My invention is also applicable to other automatic firearms which are intended to be held by the operator with both hands and which have a full automatic fire cycle. The invention is not applicable to weapons such as automatic pistols, which are fired while being held with one hand.

Briefly, the invention involves a forearm grip assembly connected to the receiver of the firearm independently of the barrel and which includes a compression spring member adapted, when compressed, to exert a forward force on the receiver of the firearm. The assembly is provided with friction producing means arranged to effect damping of the vibrations of the compression spring member during full automatic fire of the weapon.

For a more complete understanding of my invention, reference is had to the accompanying drawings showing exemplary forms of my invention. In the drawings.

Figure 1:
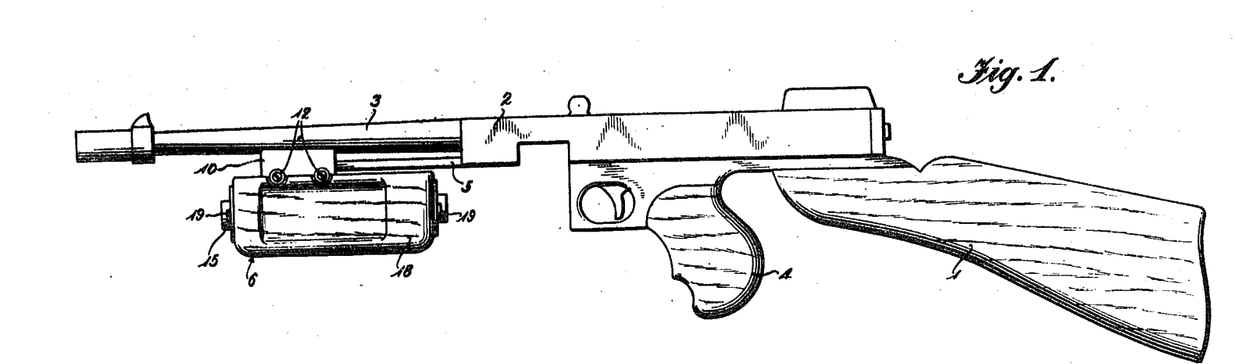
Figure 1 is a side elevation view of a sub-machine gun with one form of my novel forearm grip assembly attached thereto.
Figure 2:
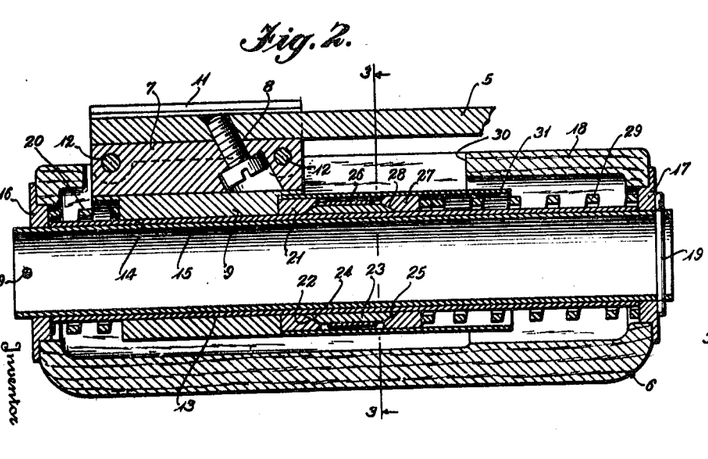
Figure 2 is a longitudinal sectional view of the forearm grip assembly shown in Figure 1.
Figure 3:
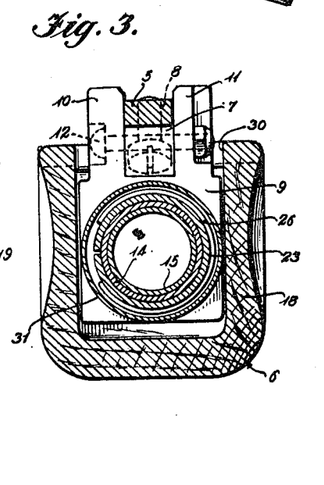
Figure 3 is a transverse sectional view looking in the direction of the arrows along the line 3—3 of Figure 2.

The sub-machine gun illustrated in Figure 1, as an example of one type of firearm with which my invention is useful, is provided with a stock 1, a receiver 2, a barrel 3 and a rear grip 4. A forearm grip mounting 5 is rigidly secured to the receiver 2 and extends forwardly in a direction generally parallel to the barrel 3. The forearm grip assembly illustrated in Figures 1 to 3 is designated generally by the reference numeral 6 and is attached to the free or forward end of the forearm grip mounting 5 in a manner more fully described hereinafter. Neither the forearm grip mounting 5 nor the forearm grip assembly 6 is attached to the barrel 3.

In Figures 2 and 3, an adapter block 7 is shown attached to the forward end of the forearm grip mounting 5 by means of a cap screw 8. A block 9 is provided with upwardly extending flanges 10 and 11 which lie on opposite sides of the mounting 5 and the adapter block 7, and are secured to the latter by means of bolts 12.

A longitudinal bore 13 extends through the block 9 with its axis generally parallel to the mounting 5. Outer tube 14 is received within the bore 13 and is reciprocable therein relative to the block 9. An inner tube 15 is telescoped in the outer tube 14. Flanged end plates 16 and 17 are positioned respectively at the forward and rear ends of the inner tube 15. These end plates serve to position a hollow hand grip piece 18 about the telescoping tubes 14 and 15 in a manner most clearly illustrated in Figure 2. The end plates 16 and 17 are retained in position on the ends of the tube 15 by means of pins 19.

A compressible coil spring member 20 surrounds the tube 14 and is positioned between the rear face of the front end plate 16 and the forward face of the block 9. A bushing 21 also surrounds the tube 14 and abuts against the rear face of the block 9. The bushing 21 is annular in form and at its rear end is provided with an inwardly tapering face 22. A split friction ring 23 (see Figure 9) surrounds the tube 14 immediately to the rear of the bushing 21. The friction ring 23 is preferably constructed of bronze and is provided with a tapered face 24 at its forward end and a similarly tapered face 25 at its rear end. As best seen in Figure 2, the tapered face 24 at the forward end of the friction ring 23 is of a configuration to fit snugly against the tapered rear face 22 of the bushing 21. A spring steel clip 26 (see Figure 10) partially encircles the friction ring 23 and urges the surface of the bore through the split friction ring into contact with the outer surface of the tube 14. A second bushing 27 surrounds the tube 14 and lies immediately to the rear of the friction ring 23. The bushing 27 (see Figure 11) is provided at its forward end with a tapered face 28 which fits snugly against the tapered face 25 of the friction ring 23. A compressible coil spring 29 surrounds the tube 14 and lies between the forward face of the end plate 17 and the rear face of the bushing 27. It will be noted from Figure 2 that the spring member 29 is of substantially greater length than the spring member 20.

The hand grip piece 18 is provided with an upper opening 30 which is elongated to permit longitudinal movement of the hand grip piece relative to the block 9 and its flanges 10 and 11. I have found it advisable to provide a cover tube 31 to assist in protecting the tubes, the bushing and the friction ring from dust or other foreign matter.

Figures 1 and 2 illustrate the positions of the various elements of the forearm grip assembly which those elements occupy when the weapon is not in use. Under these circumstances, the stresses in the spring members 20 and 29, which are relatively light due to the fact that these spring members are only slightly compressed, balance each other and the block 9 assumes what might be termed the neutral position shown in Figure 2. When the various elements occupy the position shown in Figure 2, the friction ring 23 grips the outer surface of the tube 14 very lightly and this gripping action is only sufficient to present a slight frictional resistance to movement of the tube 14 relative to the ring 23. I will now describe the use of my forearm grip assembly for its intended purpose, that is the suppression of a rising motion of the muzzle of the firearm.

The operator grasps the rear grip 4 in one hand and the forearm grip piece 18 of the forearm grip assembly 6 in the other hand and appropriately positions the firearm either at the shoulder or the hip, according to the preferred mode of firing. The operator then simultaneously pushes forwardly with the hand engaging the forearm grip piece 18 and pulls rearwardly with the hand grasping the rear grip 4. The weapon may then be fired at full automatic fire and it will be found that the tendency of the muzzle to rise or climb is eliminated or suppressed to an extent which enables the operator to easily hold the target within the line of fire.

I do not desire to limit my invention to any particular theory of operation or explanation of the principles involved, but it is appropriate to describe briefly the functions which the various elements appear to perform when the assembly is manipulated in the manner described above. Since the rear grip 4 and the forearm grip mounting 5 are both rigidly attached to the receiver 2, it is apparent that when the forearm grip piece 18 is moved forwardly there must be a forward displacement of the tubes 14 and 15 relative to the block 9. This displacement causes an increase in the compression of the spring member 29. Due to the increase in compression of the spring member 29, the tapered face 28 of the bushing 27 coacts with the tapered rear face of the friction ring 23 with a resulting increase in the frictional gripping action of the ring 23 on the tube 14. At the same time, the tapered rear face 22 of the bushing 21 coacts with the tapered face 24 of the friction ring 23 and likewise urges the ring 23 into more intimate frictional engagement with the outer surface of the tube 14. Recoil shocks to which the receiver 2 is subjected are transmitted to the block 9 through the mounting 5 and the adapter block 7 but any tendency of the block 9 to partake of recoil movement is resisted by resilient action of the spring member 29. Friction between the friction ring 23 and the tube 14 appears to be effective to eliminate any possibility of the spring member 29 vibrating excessively. In other words, the friction ring 23 appears to effect a damping action on vibrations of the spring 29 without, however, interfering with the ability of the spring member to absorb recoil shocks and to thus suppress the climbing tendency of the muzzle of the weapon. When the forearm grip piece 18 is released by the operator, the elements, of course, assume the neutral positions shown in Figure 2.

Figures 6, 7, 8, 9, 10, 11:
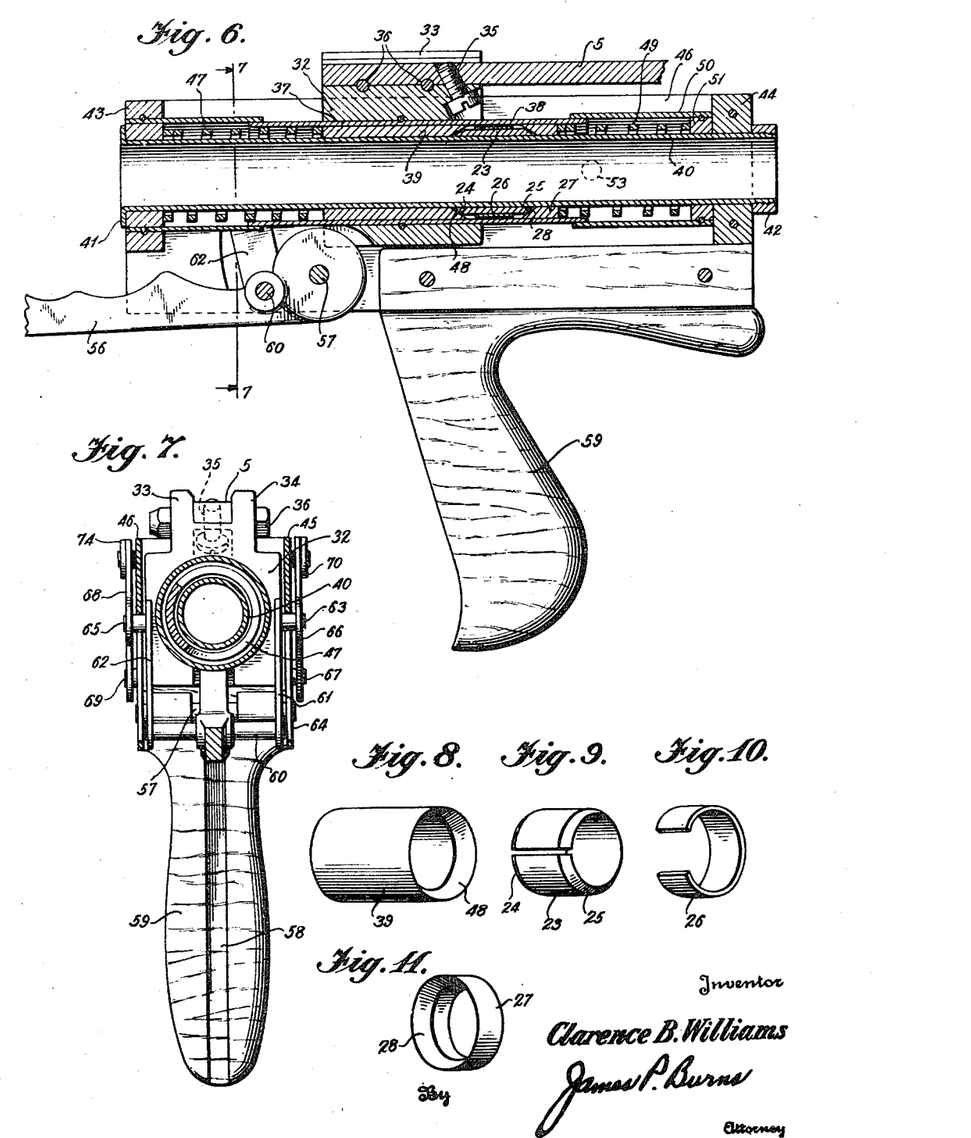
Figure 6 is a sectional view taken in the direction of the arrows along the line 6—6 of Figure 5.
Figure 7 is a transverse sectional view taken in the direction of the arrows along the line 7—7 of Figure 6.
Figures 8, 9, 10 and 11 are perspective views of the various elements of the friction producing means for damping vibrations of the compression spring members of the assemblies.
Figure 12:
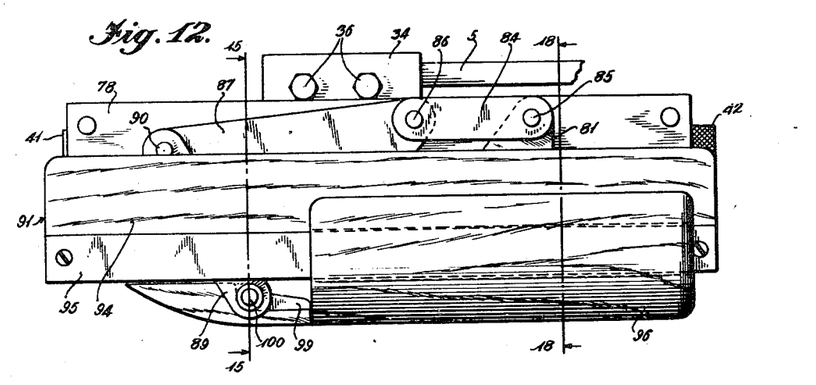
Figure 12 is a side elevation view of a third form of my invention.

The form of the invention described above in connection with Figures 1 to 3 of the drawings is probably the most simple of the illustrated forms and, for that reason, it well serves the purpose of illustrating the general principles involved in my invention. However, some operators consider that the necessity of pushing forwardly with the hand engaging the forearm grip assembly results in an awkward or unnatural feeling while using the weapon and for that reason I prefer to provide additional forms of my invention in which it is unnecessary for the operator to push forwardly on the forearm grip assembly. One such form of the invention is shown in Figures 4 to 7, inclusive. Referring first to Figure 6, the reference numeral 32 designates a block provided with upwardly extending flanges 33 and 34. The forearm grip mounting 5 is received between the flanges 33 and 34 and is secured to the block 32 by means of a cap screw 35 or bolts 36 or both. The block 32 is provided with a bore 37, the axis of which extends generally parallel to the mounting 5 and positioned within the bore 37 is a cover tube 38. A bushing 39 lies within the cover tube 38 and surrounds an elongated tube 40, each end of which extends well beyond the block 32. The tube 40 is provided at one end thereof with an outwardly extending annular flange 41 and is threaded at the opposite end for reception of a threaded retainer ring 42. A rectangular box-like frame structure having end plates 43 and 44 and side plates 45 and 46 is supported by the tube 40 in the manner best shown in Figure 6 and is retained thereon by means of the flange 41 and the retainer ring 42.

A compressible coil spring member 47 surrounds the tube 40 and lies between the rear face of the end plate 43 and the forward face or end of the bushing 39. The rear end of the bushing 39 is provided with an inwardly tapering face 48. This bushing is best shown in Figure 8 of the drawings. This form of the invention is also provided with a friction ring, a spring clip and a rear bushing and since these parts are all identical with the corresponding parts in the form of the invention shown in Figures 1 to 3, they are designated by the same reference numerals. A compressible coil spring member 49 also surrounds the tube 40 and lies to the rear of the rear end of the bushing 27. A tubular spring compressing member 50 surrounds the spring member 49 and is arranged to telescope over the cover tube 38. The spring compressing member 50 is provided with an inwardly extending flange 51 which abuts against the rear end of the spring member 49. The inwardly extending flange 51 may be made integral with the member 50 or it may be secured thereto in any convenient manner.

The spring compressing member 50 is provided with a pair of oppositely disposed laterally extending bosses 52 and 53, which extend through elongated slots 54 and 55 in the side plates 45 and 46 respectively. In this form of the invention, a lever and mechanical linkage arrangement are provided for cooperating with the bosses 52 and 53 for moving the spring compressing member 50 forwardly. A lever 56 is journaled on a shaft 57 which is supported in openings in the side plates 45 and 46. The lever 56 is movable from the full line position in Figure 4 to the broken line position and in the latter position the lever is partially received in a groove 58 of a pistol grip 59, which is rigidly secured to the side plates 45 and 46.

Figure 4:
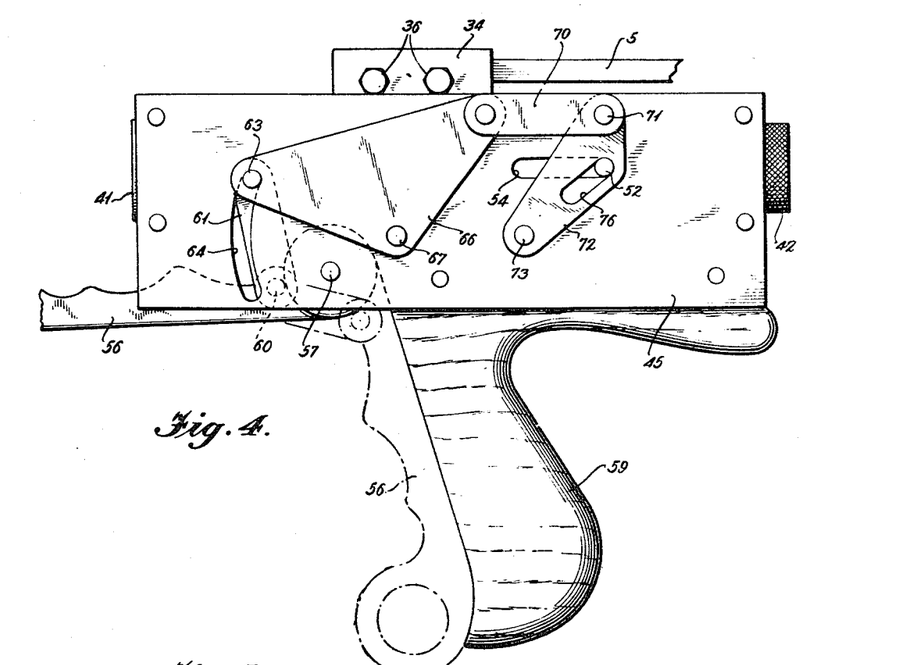
Figure 4 is a side elevation view of a modified form of forearm grip assembly.
Figure 5:
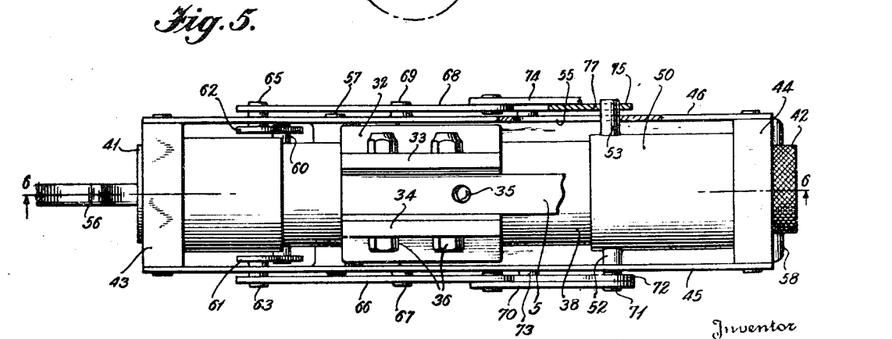
Figure 5 is a top plan view of the forearm grip assembly shown in Figure 4.

A shaft 60 extends through the lever 56 in a position slightly spaced toward the free end of the lever from the shaft 57. On the ends of the shaft 60 are links 61 and 62 which lie just inside the side plates 45 and 46 respectively. The upper end of the link 61 is provided with an outwardly extending boss 63 which extends through an arcuate groove 64 in the side plate 45 and the link 62 is similarly provided with an outwardly extending boss 65 lying in an arcuate slot in the side plate 46. A triangular shaped link 66 is pivoted on the side plate 45 at 67 and a similar triangular shaped link 68 is pivoted on the side plate 46 at 69. The forward ends of the triangular shaped links 66 and 68 are journaled on the bosses 63 and 65 respectively. A link 70 has one end pivotally connected to the triangular shaped link 66 while its opposite end is pivotally connected at 71 to the upper end of a slotted link 72, the lower end of which is pivoted to the side plate 45 at 73. Similarly, the rear end of the triangular shaped link 68 has pivotally connected thereto a link 74 which in turn is pivotally connected to a slotted link 75 pivoted to the side plate 46. The slotted links 72 and 75 are respectively provided with elongated slots 76 and 77 for receiving the bosses 52 and 53 on the spring compressing member 50.

From the foregoing description it will be apparent that movement of the lever 56 from the full line position shown in Figure 4 to the broken line position will effect a forward movement of the spring compressing member 50. This forward movement of the spring compressing member 50 results in compression of the spring members 47 and 49 and it also causes an increase in the frictional gripping action of the friction ring 23 on the tube 40 in the same manner as described above in connection with the description of the form of the invention shown in Figures 1 to 3. The general principle of operation of this form of the invention is identical with the principle of operation of the form shown in Figures 1 to 3, but it will be noted that in this form of the invention it is unnecessary for the operator to exert a forward push on the forearm grip assembly.

The form of the invention illustrated in Figures 12 to 18 permits the operator to render the forearm grip assembly operative for its intended purpose by exerting a backward pull on the forearm grip. In this form of the invention, the block, tube, spring members, friction ring, bushings and spring compressing member are identical with those described in connection with the description of the form of the invention shown in Figures 4 to 7, and are consequently designated by like reference numerals. The end plates 43 and 44 may also be identical with the end plates described above, but the side plates 78 and 79 of the frame structure necessarily differs somewhat from the side plates 45 and 46. The bosses 52 and 53 on the spring compressing member 50 extend through slots 80 in the side plates 78 and 79 respectively. A slotted link 81 is pivoted to the side plate 78 at 82 and is provided with a slot 83 for receiving the boss 52. A link 84 is pivoted at 85 to one end of the slotted link 81 while the opposite end of this link 84 is pivoted at 86 to a triangular shaped link 87. The triangular shaped link 87 is pivoted to the side plate 78 at 88. A link 89 is pivotally connected to the triangular shaped link 87 at 90. The side plate 79 is provided with similar slots and links and the corresponding parts are designated by the same reference numerals. A generally U-shaped member, which is designated by the reference numeral 91 and which is preferably constructed of wood, encloses the lower portion of the assembly and is secured to the end plates 43 and 44 by means of screws 92. As is clearly shown in Figure 15, the sides 94 of the member 91 provide adequate clearance for the linkage mechanism assembled on the side plates 78 and 79. Identical metal strips 95 are secured to opposite sides of the member 91 in positions most clearly shown in Figures 14 and 15. The strips 95 serve as guides for a hand grip piece 96 which is reciprocable with respect to the member 91 and is provided with grooves 97 for receiving the strips 95.

Figure 13:
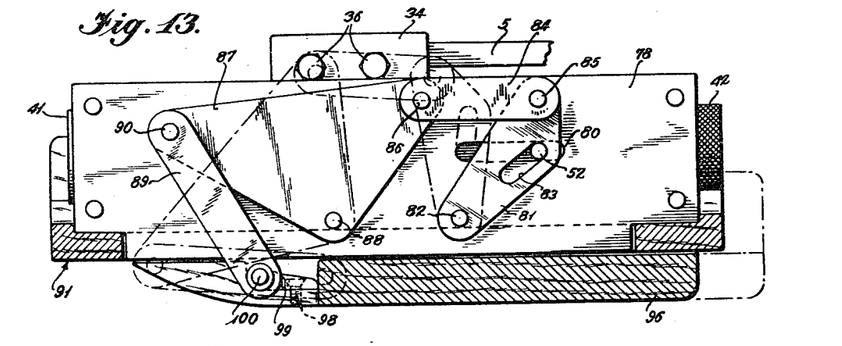
Figure 13 is a sectional view taken in the direction of the arrows along the line 13—13 of Figure 16.
Figure 14:
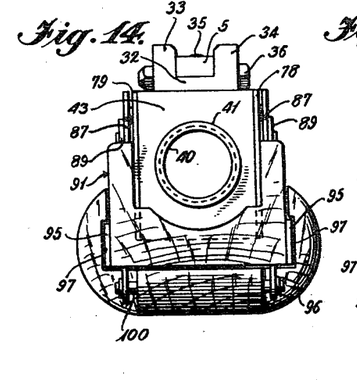
Figure 14 is an end elevation view of the forearm grip assembly shown in Figure 12.
Figure 15:
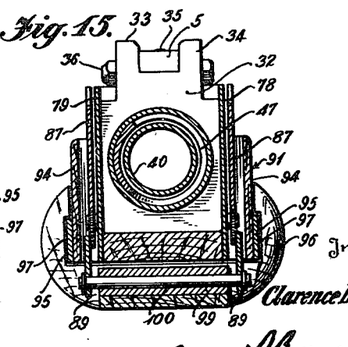
Figure 15 is a sectional view looking in the direction of the arrows along the line 15—15 of Figure 12.
Figure 16:
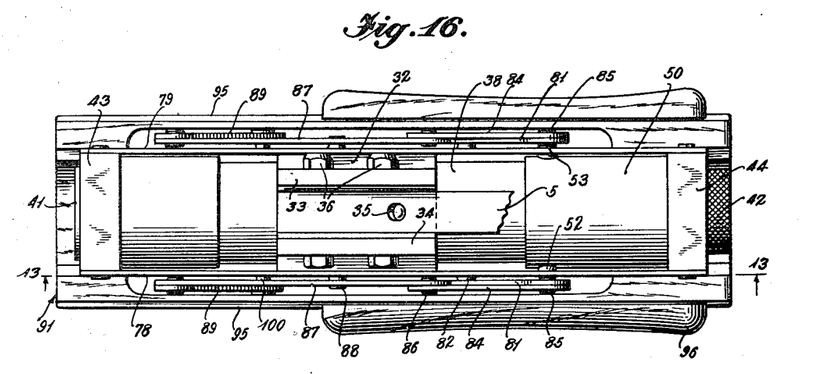
Figure 16 is a top plan view of the forearm grip assembly shown in Figure 12.
Figure 17:
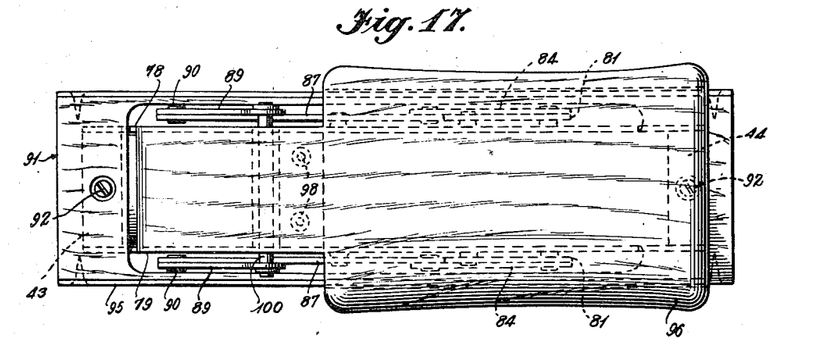
Figure 17 is a bottom plan view of the assembly shown in Figure 12.
Figure 18:
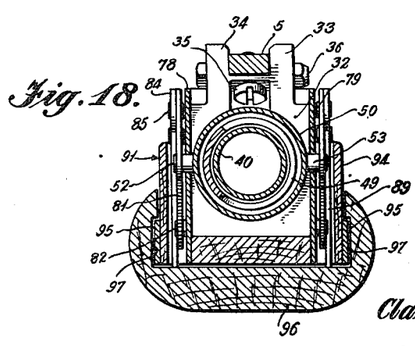
Figure 18 is a sectional view taken in the direction of the arrows along the line 18—18 of Figure 12.

Attached to the forward portion of the hand grip piece 96 by means of screws 98 is a metal bearing member 99 and passing through this bearing member is a shaft 100 which is connected to the lower ends of the links 89. Referring now to Figure 13, it will be apparent that when the hand grip piece 96 is moved from the position in which it is shown in full line to the position shown in broken line, the various links will also move from their full line positions to their broken line positions with a resulting forward movement of the bosses 52 and 53 and also of the spring compressing member 50. This results in compression of the spring members 47 and 49 and causes the friction ring 23 to frictionally grip the outer surface of the tube 40 in the manner which has been described above. When this form of the invention is attached to a weapon such as that shown in Figure 1, the operator merely grasps the hand grip piece 96 and pulls backwardly thereon to suppress the rising or climbing tendency of the muzzle of the weapon.

Figures 19, 20, 21:
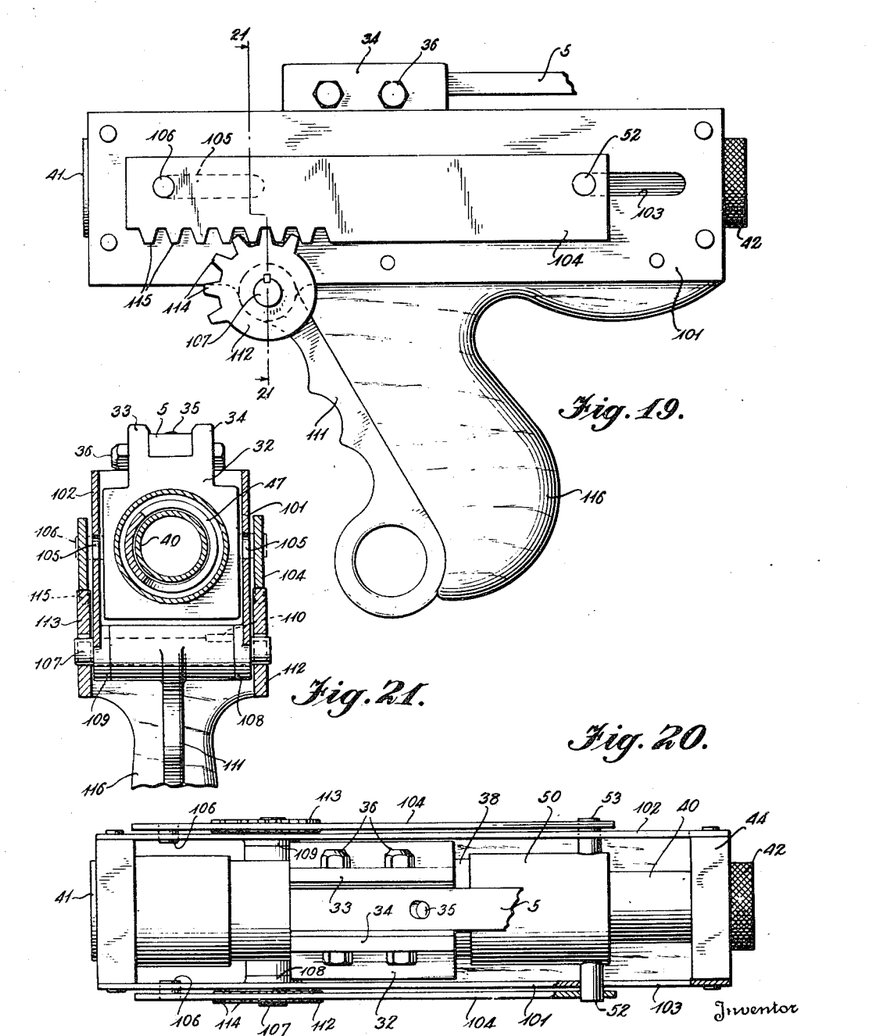
Figure 19 is a side elevation view of a fourth form of my invention.
Figure 20 is a top plan view of the forearm grip assembly shown in Figure 19.
Figure 21 is a sectional view taken in the direction of the arrows along the line 21—21 of Figure 19.

The form of the invention shown in Figures 19 to 21 operates in somewhat the same manner as the form disclosed in Figures 4 to 7. Many of the elements in this form of the invention are identical with those described above and are designated by the same reference numerals. The side plates 101 and 102 are provided with horizontally extending rear slots 103 for the bosses 52 and 53 on the spring compressing member 50. A rack plate 104 is provided on each side plate and receives the projecting ends of the bosses 52 and 53. The side plates 101 and 102 are also provided with forward horizontally extending slots 105 and the forward ends of the rack plate 104 are provided with inwardly extending stub projections 106 which are received in the slots 105. By this arrangement the rack plates 104 are movable longitudinally with respect to the side plates 101 and 102 and the spring compressing member 50 will be caused to move with the rack plates by virtue of their connections through the bosses 52 and 53. A shaft 107 is mounted in bearings 108 and 109 on the side plates 101 and 102 respectively and keyed to this shaft by a key 110 is a lever 111. Segmental gear members 112 and 113 are keyed to the ends of the shaft 107 and lie outside the side plates 101 and 102 respectively. The segmental gear members 112 and 113 are provided with gear teeth 114 which cooperate with gear teeth 115 on the rack plates 104. A pistol grip 116 is attached to the side plates 101 and 102 in the position clearly shown in Figure 19.

In Figures 19 to 21, this form of the invention is illustrated in its operative position, that is with the spring members 47 and 49 compressed. When this assembly is attached to a firearm such as that illustrated in Figure 1, the operator merely grasps the pistol grip 116 and the lever 111 and draws the lever 111 toward the pistol grip so that it occupies the position shown in Figure 19. The weapon may then be fired at full automatic fire and the tendency of the muzzle of the weapon to climb will be suppressed to the extent that the target may be held in the line of fire.

The several forms of my invention which I have illustrated and described are exemplary only. It will be obvious that various modifications may be resorted to without sacrificing the advantages of my invention.

Having thus described my invention, I claim:

1. A forearm grip assembly for suppressing the tendency of the muzzle of an automatic firearm to climb during automatic firing comprising a forearm grip mounting having one end secured to the receiver of the firearm and extending forwardly in a direction generally parallel to the barrel of the firearm, a block carried by the forward end of said mounting and having a bore therethrough with the axis of the bore generally parallel to the barrel of the firearm, an elongated member extending through and reciprocable in said bore, a compression spring member surrounding said elongated member to the rear of said block, a manually operable forearm grip connected to said elongated member for engaging the rear end of said spring member and compressing said spring member toward said block whereby rearward movement of said block relative to said elongated member is opposed by compressive stresses in said spring member, and means adjacent said block for providing frictional resistance to reciprocation of said block relative to said elongated member.

2. A forearm grip assembly for suppressing the tendency of the muzzle of an automatic firearm to climb during automatic firing comprising a forearm grip mounting having one end secured to the receiver of the firearm and extending forwardly in a direction generally parallel to the barrel of the firearm, a block secured to the forward end of said mounting and having a bore therethrough with the axis of the bore generally parallel to the barrel of the firearm, an elongated member extending through and reciprocable in said bore, a front compression spring member surrounding said elongated member in advance of said block, a rear compression spring member surrounding said elongated member to the rear of said block, a forearm grip piece connected to said elongated member and including means for engaging and compressing the remote ends of said spring members toward said block whereby movement of said block relative to said elongated member is opposed by balanced compressive stresses in said front and rear spring members, and means adjacent said block for providing frictional resistance to reciprocation of said block relative to said elongated member.

3. A forearm grip assembly for suppressing the tendency of the muzzle of an automatic firearm to climb during automatic firing comprising a forearm grip mounting having one end rigidly secured to the receiver of the firearm and extending forwardly in a direction generally parallel to the barrel of the firearm, a block secured to the forward end of said mounting and having a bore therethrough with the axis of the bore generally parallel to the barrel of the firearm, an elongated member extending through and reciprocable in said bore, a compression coil spring member surrounding said elongated member and disposed to the rear of said block, compressing means on said elongated member engaging the rear end of said spring member, friction means on said elongated member between said spring member and said block for providing frictional resistance to movement of said block relative to said elongated member upon compression of said spring member, and a forearm grip having manually operable means for moving said compressing means forwardly to effect compression of said spring member.

4. A forearm grip assembly for suppressing the tendency of the muzzle of an automatic firearm to climb during automatic firing comprising a forearm grip mounting having one end secured to the receiver of the firearm and extending forwardly in a direction generally parallel to the barrel of the firearm, a block secured to the forward end of said mounting and having a bore therethrough with the axis of the bore generally parallel to the barrel of the firearm, an elongated member extending through and reciprocable in said bore, a compression spring member surrounding said elongated member and disposed to the rear of said block, compressing means on said elongated member engaging the rear end of said spring member, means adjacent said block for providing frictional resistance to movement of said block relative to said elongated member upon compression of said spring member against said block, and a forearm grip having means for manually moving said compressing means forwardly to effect compression of said spring member against said block.

5. A forearm grip assembly for suppressing the tendency of the muzzle of an automatic firearm to climb during automatic firing comprising a block attached to the receiver of the firearm but free from attachment to the barrel of the firearm, said block having a bore extending therethrough in a direction generally parallel to the barrel of the firearm, an elongated member extending through and reciprocable in said bore, a compression spring member surrounding said elongated member and disposed to the rear of said block, a manually operable forearm grip mechanism mounted against longitudinal movement on said elongated member and including means for engaging and compressing said spring member toward said block whereby rearward movement of said block relative to said elongated member is opposed by compressive stresses in said spring member, and friction means interposed between said block and the forward end of said spring member for providing frictional resistance to reciprocation of said block relative to said elongated member.

6. A forearm grip assembly for suppressing the tendency of the muzzle of an automatic firearm to climb during automatic firing, comprising a block secured to the receiver of the firearm, said block having a bore therethrough with the axis of the bore generally parallel to the barrel of the firearm, an elongated member extending through and reciprocable in said bore, a front compression spring member surrounding said elongated member forwardly of said block, a rear compression spring member surrounding said elongated member rearwardly of said block, a forearm grip connected to said elongated member, means associated with said forearm grip for engaging the remote ends of said front and rear spring members and compressing said spring members toward said block whereby longitudinal movement of said block relative to said elongated member is opposed by balanced compressive stresses in said front and rear spring members, and friction means on said elongated member between said block and the forward end of said rear spring member arranged to provide frictional resistance to longitudinal movement of said block relative to said elongated member.

CLARENCE B. WILLIAMS.